Oct. 7, 1969 T. B. R. OLSSON ET AL 3,471,743

CIRCUIT SYSTEM FOR ENLARGING A SELECTED PART OF THE IMAGE ON THE SCREEN OF A CATHODE RAY TUBE

Filed Oct. 23, 1967 4 Sheets-Sheet 1

INVENTORS
Tore Bertil Reinhold Olsson
Hans Gunnar Berggren

BY Hane and Baxley

ATTORNEYS

INVENTORS
Tore Bertil Reinhold Olsson
Hans Gunnar Berggren
BY Hane and Baxley
ATTORNEYS INVENTORS
Tore Bertil Reinhold Olsson
Hans Gunnar Berggren BY Hane and Baxley

ATTORNEYS

INVENTORS
Tore Bertil Reinhold Olsson
Hans Gunnar Berggren

BY Hane and Baxley

ATTORNEYS

United States Patent Office 3,471,743
Patented Oct. 7, 1969

3,471,743

CIRCUIT SYSTEM FOR ENLARGING A SELECTED PART OF THE IMAGE ON THE SCREEN OF A CATHODE RAY TUBE

Tore Bertil Reinhold Olsson and Hans Gunnar Berggren, Karlskoga, Sweden, assignors to Aktiebolaget Bofors, Sweden, a Swedish corporation Filed Oct. 23, 1967, Ser. No. 677,450
Claims priority, application Sweden, Mar. 14, 1967, 3,548/67
Int. Cl. H01j 29/70
U.S. Cl. 315—24 10 Claims

ABSTRACT OF THE DISCLOSURE

A circuit system for enlarging in one or both directions of deflection a selected part of the image on the screen of a cathode ray tube by changing the starting moment of time and the sweep velocity of a sweep signal effecting the deflection of the beam of the cathode ray tube and controllable by a synchronizating signal. The changes in the starting moment of time and in the sweep velocity are effected by connecting a trigger circuit including a time delay network between the source for generating the synchronizing signals and the sweep generator for generating the sweep signals.

It is generally known to use cathode ray tubes in which an electron beam generated by an electron gun is deflected in two directions, generally at right angles to one another, by means of an electric or magnetic field. Such arrangements are used in oscilloscopes, television receivers and the like. It is also known to vary in such arrangements continuously or in stages the sweep velocity of the electron beam across the picture screen of the tube, for instance in the case of an oscilloscope, for the purpose of adapting the scanning velocity to a periodically varying signal fed to the respective deflecting means of the tube to obtain, for instance, a stationary image of the wave from the periodic signal. In conventional arrangements of the general kind above referred to, a change in the sweep velocity occurs but the origin of the electron beam and the total deflection remain substantially unchanged.

However, in certain applications it has been found desirable to remove a portion of a display and enlarge the same so that the removed portion of the image covers substantially the portion of the picture screen of the cathode ray tube which is left for observation.

A similar problem has arisen in certain cases in television cameras operating within the infrared range, in which due to the used optical mirror arrangement the picture, in certain instances, obtained on the picture screen of the cathode ray tube has a comparatively wide extension in one direction and a lesser extension in the other direction. As an example it can be assumed that in a particular case the picture on the picture screen is six cm. wide and two cm. high. It is then desired, for instance, to remove the portion of picture which occupies two cm. of the intermediate portion of the elongated image, thus being between two cm. and four cm. in the longer dimension, and to enlarge this portion so as to form a picture having one side six cm. long. At the same time it may be desired to retain the full height of two cm. or also to increase the height of the picture so that a picture of six by six cm. is obtained.

In this connection it is obvious that it is not sufficient to make a simple change in the sweep velocity to obtain the desired enlargement. If one first considers the longer dimension of the original picture which occupied the space in horizontal direction from 0 to six cm., the portion thereof situated between two cm. and four cm. is to be enlarged to constitute six cm. and, at the same time, the starting point for this portion will be brought to 0 cm. It should be noted in this connection that the reproduction of the picture is controlled by synchronizing signals emanating from, for instance, the optical system in an infrared television camera, said signals having fixed time positions which cannot be changed. It has been found that the sweep generator used must be changed in such a way that its sweep velocity is increased, such as trebled simultaneously, because the start of this sweep of increased velocity is begun later, namely at the moment when under normal conditions the sweep would have reached the point designated two cm. along the horizontal axis. Further, to insure that only the intended distance of the original image which was positioned between two cm. and four cm. shall be included, it is clear that the total extension of the sweep shall be restricted to the desired value six cm. (equal to the earlier horizontal extension) by restricting the time used for the faster sweep so that as before the deflection finishes at the point six cm. and returns to the starting position.

According to the above assumption, the entire picture height should be utilized vertically, but is increased from the original two cm. to six cm. Therefore no change of the starting point of the sweep or of the total sweep time need to take place, but it is sufficient to increase the amplification in an amplifier inserted between the sweep generator and the deflecting element of the cathode ray tube. If it be desired to obtain a vertically symmetric picture relative to the previous position, a change in the vertical starting point on the picture screen is effected by changing, for instance, a bias, but this becomes unnecessary with symmetric deflection.

The essential features of the invention are set forth in the accompanying claims.

To facilitate the understanding of the present invention, reference is made to the following specification which, with reference to the accompanying drawings, shows an example of one embodiment of the invention by way of illustration and not by way of limitation.

Figure 1:
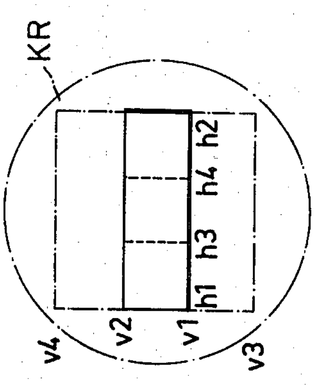
FIG. 1 shows an example of a picture change according to the invention.

FIG. 1 shows a picture screen of a cathode ray tube KR, the screen being circular in shape. There is shown within the screen by full lines the picture obtained in a certain instance with an infrared television camera. The picture extends horizontally from point *h*1 to point *h*2 and vertically from point *v*1 to point *v*2. According to the present invention, it is desired to obtain an enlarged picture of the portion of the original picture lying between the points *h*3 and *h*4 to occupy horizontally the space between the points *h*1 and *h*2. At the same time it may be desired to enlarge the picture vertically so that the original portion situated between the two points *h*3 and *h*4 and *v*1 and *v*2 occupies the whole of the field given by dash-dot lines on the picture screen, that is, a picture which extends horizontally between the points *h*1 and *h*2 and vertically between the points *v*3 and *v*4.

Figure 2:
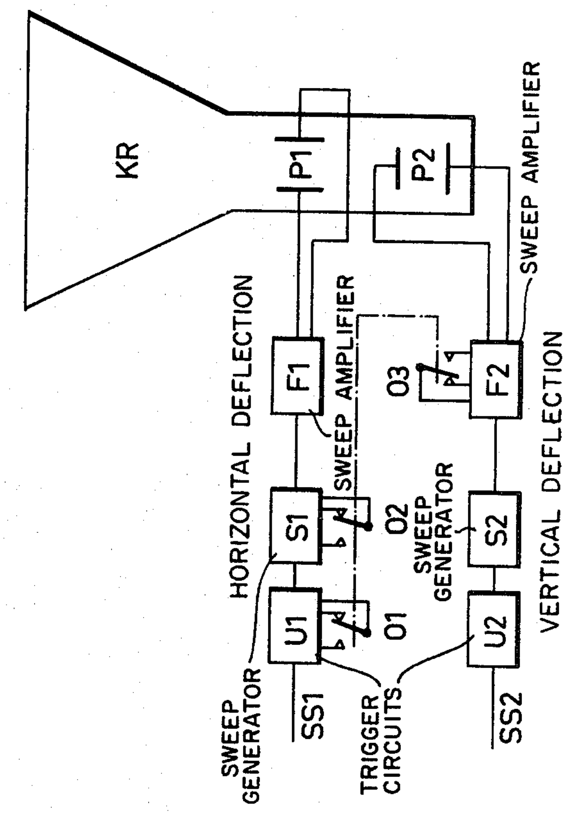
FIG. 2 is a block diagram of an embodiment of the invention.

The block diagram of FIG. 2 shows the arrangement of a circuit system according to the invention. Sync. signals, with determined time positions, are obtained by conventional means not shown and are designated SS1 for the horizontal deflection and SS2 for the vertical deflection.

The sync. signals, for instance, may be constituted for example of short square pulses. The shape of the signals is not pertinent to the invention except to the extent that they are capable of actuating the trigger circuit at predetermined instants of time, and consequently are not described in detail.

Each of the sync. signals is passed to its trigger circuit, which for the horizontal deflection is designated U1 and for the vertical deflection U2. The purpose of the trigger circuits is to start, after predetermined time delays, a conventional sweep generator S1 for the horizontal deflection and a conventional sweep generator S2 for the vertical deflection. A time delay in the present case is unavoidably necessary with regard to the sweep generator for the horizontal deflection if the enlarged picture portion is to be positioned in the picture field in a given manner. Further, it has been found that when using the trigger circuits U1 and U2 a much greater freedom is obtained with regard to the instants of time for generating the sync. signals in dependence, for instance, on the instantaneous positions of optical scanning means. This permits design possibilities in regard to the mechanical structure which are otherwise not available.

Each of the generated sweep signals is passed from each of the sweep generators S1 and S2 to a conventional sweep amplifier F1 and F2 respectively. The sweep amplifiers are connected respectively to pairs of deflection plates P1 for horizontal deflection and plates P2 for the vertical deflection.

It should be mentioned that in the described embodiment deflection is caused by means of pairs of plates, that is, by means of electric fields, but it is obvious to those skilled in the art that deflection coils could be used to effect deflection by means of magnetic fields, or a combined arrangement with, for instance, pairs of plates for horizontal deflection and coils for vertical deflection, or vice versa.

To obtain the desired picture enlargement of the screen portions *h*3–*h*4, there are provided a number of switches, namely a switch 01 for changing the time delay in the trigger circuit U1, a switch 02 for changing the rate of the sweep signal generated by the sweep generator S1, and finally a switch 03 for changing the amplification in the sweep amplifier F2 for the vertical deflection. The switches, 01, 02 and 03 are mechanically ganged and adjust in one position the picture of the screen portion situated between *h*3 and *h*4, shown in full lines, and in the other position the portion of the original picture situated As already mentioned, the function of the trigger circuits U1 and U2 is to produce trigger signals for sweep generators S1 and S2 respectively, with a certain time delay, which with regard to the trigger circuit U1 shall be capable of being changed by means of switch 01. Since the principal structure of the trigger circuits U1 and U2 is the same, with the exception that there is no switch for circuit U2 which can thus be set for a fixed delay, the trigger circuit U1 will be described in greater detail in the following.

Figure 3:
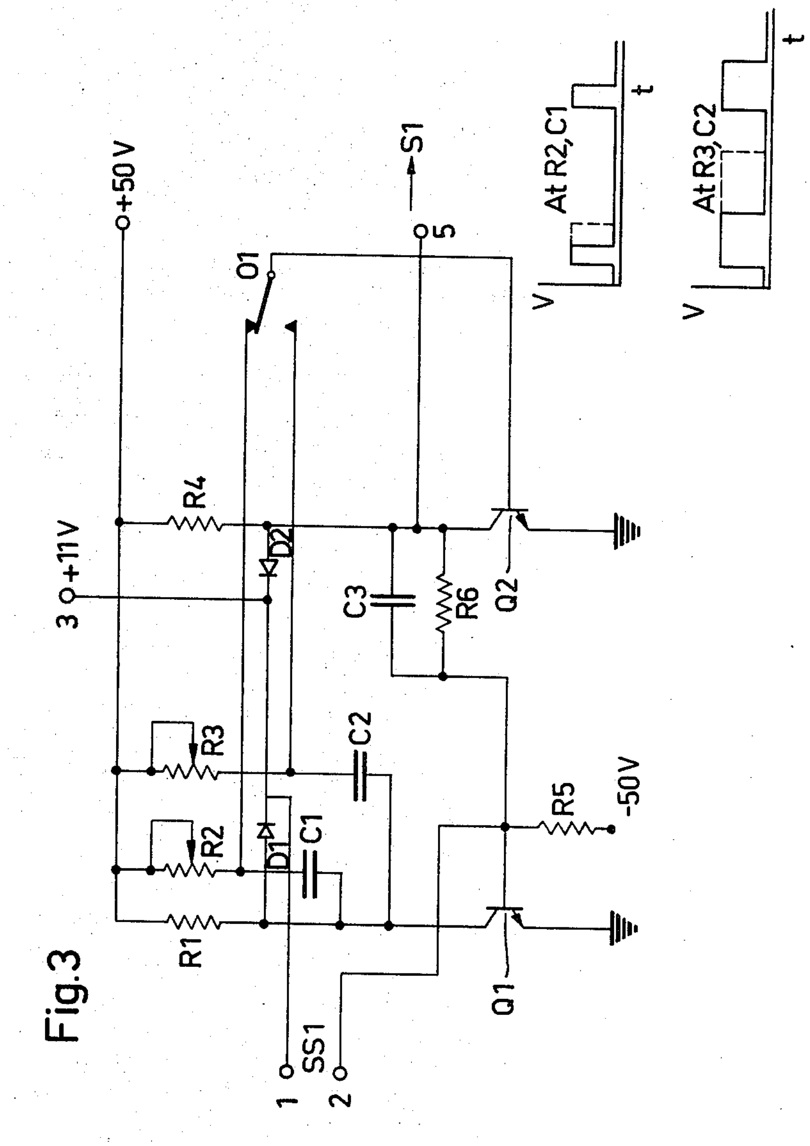
FIG. 3 is a detailed diagram of a trigger circuit for a sweep generator.

FIG. 3 shows a more detailed diagram of the trigger circuit U1. The circuit is shown as a mono-stable arrangement—multivibrator—including two transistors Q1 and Q2 of the NPN type. At the selected voltage conditions Q2, irrespective of the position of the switch 01 which is shown in an inoperative or open position, is conductive and thus its collector current causes a voltage drop across a resistor R4 so that the output terminal 5 connected to the following sweep generator S1 has substantially a voltage near ground potential. Hence, the transistor Q1 obtains, via a resistor R6 and a resistor R5, a bias, such that it is not conductive. At the selected voltage conditions a current will pass through a resistor R1 and a diode D1 to the point 3, the collector of transistor Q1 obtaining substantially the same voltage as point 3. The base of transistor Q2 obtains a bias via either of adjustable resistors R2 or R3—depending on the position of switch 01. Each of these resistors is connected to the collector of transistor Q1 via capacitors C1 and C2 respectively. These capacitors, when transistor Q2 is conductive and transistor Q1 is non-conductive, are charged to a certain voltage. When applying a sync. signal of the correct polarity between points 1 and 2, the base of transistor Q1 obtains an increased positive potential. In reality, in the shown instance "application of the sync. signal" takes place in that a current conductive connection is created in the synchronizing arrangement, between the points 1 and 2, the current path applying to the base of transistor Q1 a changed bias via resistor R5, capacitor C3 being very small and therefore causing only a slight delay with respect to the changed bias at the base of transistor Q1. The transistor thus becomes conducting and passes current to such an extent that the voltage drop across the resistor R1 is so high that the collector of transistor Q1 falls to substantially ground potential. Owing to the fact that capacitors C1 and C2 respectively cannot discharge immediately, the capacitor electrode connected with the switch 01 and thus with the base of transistor Q2 experiences a changed voltage level which causes a change in the bias at the base of transistor Q2, towards the negative direction. Consequently the current flow through transistor Q2 is interrupted and the voltage at the collector of transistor Q2 rises to the voltage determined by diode D2, the voltage of the output terminal 5 similarly rising. At the same time as the collector voltage of transistor Q2 rises—becomes more positive—the increased positive voltage is transferred via resistor R6 (and the capacitor C3) to the base of transistor Q1, which thereby remains conductive as long as transistor Q2 is non-conductive.

As previously stated, it is the electrode of capacitors C1 and C2 respectively, which is connected to switch 01 and controls the bias at the base in transistor Q2. With the transistor Q1 conductive and thus the corresponding electrode of respective capacitors C1 and C2 respectively at fixed voltage, a recharging of the respective capacitor takes place via the adjustable resistors R2 and R3, respectively. After a time determined by the selected resistance value, the electrode connected with the switch 01 and the base of transistor Q2 reaches such a voltage that it is sufficient to make transistor Q2 again conductive. Thus, the collector voltage of transistor Q2 falls rapidly and causes a lowered voltage at the base of transistor Q1, which thereby becomes non-conductive. The thus raised voltage at the electrodes of capacitors C1 and C2 connected with the collector of transistor Q1, causes a further rise in the bias at the base of transistor Q2, whereby the passage of current through transistor Q2 is maintained. The thus occurring static state with transistor Q1 non-conductive and transistor Q2 conductive continues until a new sync. signal is applied between points 1 and 2.

It is understood that irrespective of whether the combination of resistor R2 and capacitor C1 or resistor R3 and capacitor C2 is connected, the transistor Q2 reaches its substantially non-conductive state—with the subsequent beginning of a starting pulse at point 5—at approximately the same time as the sync. signal is applied. The return of the transistor Q2 to a conductive state and thereby termination of the positive going output at the point 5 depends upon which of the combinations resistor R2, capacitor C1 and resistor R3 and capacitor C2 is connected. It has been assumed that the resistance of resistor R2 is less than that of resistor R3 and that capacitor C1 is smaller than capacitor C2. For the RC combination R2, C1 return and termination of the output pulse will thus take place a shorter period of time after the application of the sync. signal than when the RC combination R3, C2, is used—as is shown by the waveforms below point 5 in FIG. 3. Further, it has been shown by dotted lines that for the first pulse in every particular case the shown possibility of adjusting resistors R2 and R3 respectively, affords the possibility of setting the instant of time at which the pulse output ceases, within certain given limits.

Thus, from the shown trigger circuit a pulse has been produced and is delivered from the trigger circuit in response to a sync. pulse. The trailing flank of the pulse has a time position which can be adjusted stepwise as well as continuously, to be at an interval after the incoming sync. signal. By passing this pulse to a suitable sweep generator, a sweep signal may be produced beginning at an instant of time which is delay in a predetermined and variable manner, relative to the syn. signal.

In practice, the components included in FIG. 3 may have the following data:

| | |
|---|---|
| R1 | 15 kiloohms. |
| R2 | 50 adjustable down to 2 kiloohms. |
| R3 | 200 adjustable down to about 2 kiloohms. |
| R4 | 15 adjustable down to about 2 kiloohms. |
| R5 | 820 adjustable down to about 2 kiloohms. |
| R6 | 12 adjustable down to about 2 kiloohms. |
| C1 | 1000 pf. |
| C2 | 5600 pf. |
| C3 | 22 pf. |
| D1, D2 | Diode type 1N660. |
| Q1, Q2 | Transistor type 2N914. |

Figure 4:
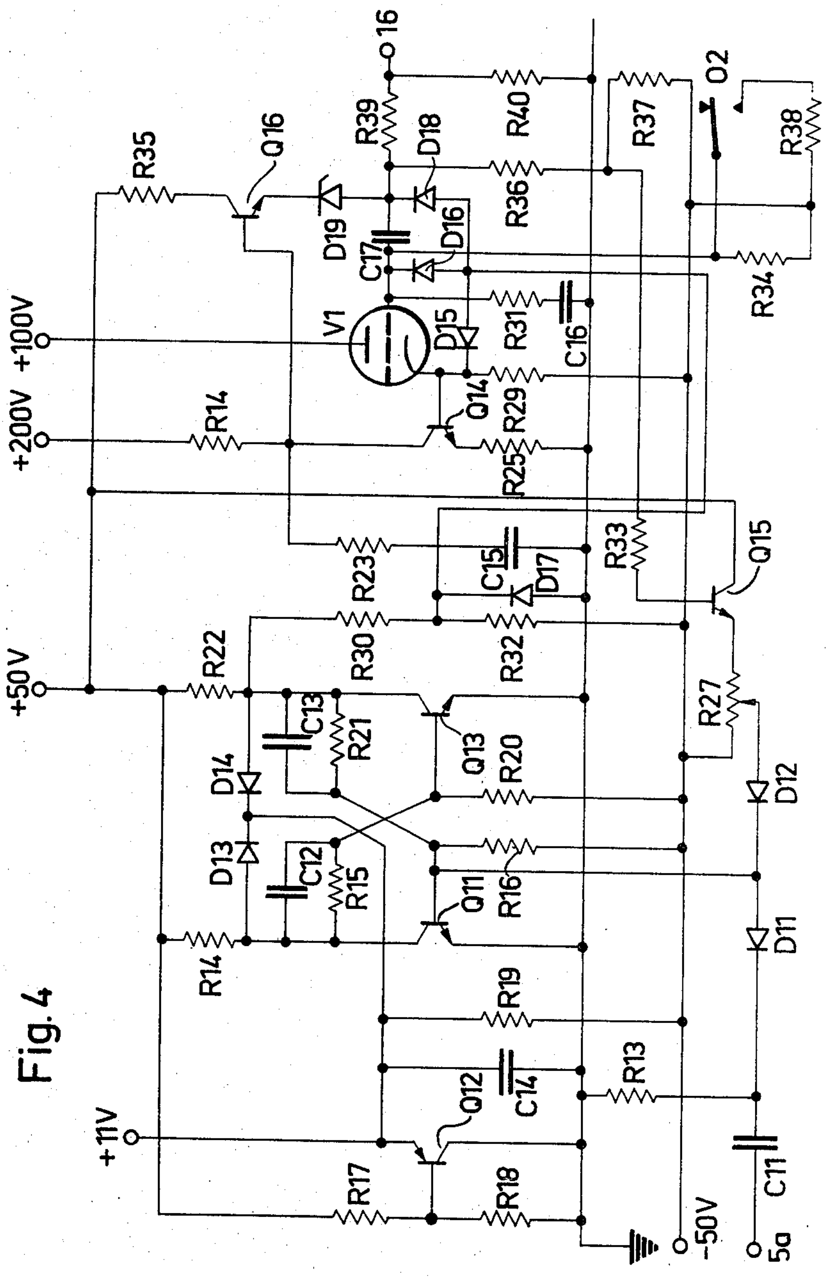
FIG. 4 is a detailed diagram of a sweep generator with switching means according to the invention.

FIG. 4 shows the sweep generator proper. The generator includes means for producing a saw tooth voltage and means for stabilizing, beam extinction, etc.; for the sake of brevity these means are only shown and will be described only as they function and the detailed recital of the interconnections of the elements deleted.

The input 5a is intended to be connected with the output point 5 in FIG. 3. When a positive square pulse arrives at input 5a, it causes, due to a capacitor C11 and a resistor R13, very short duration and peaked pulses owing to the obtained differentiation of the square signal. A positive pulse (a "spike") is obtained for the leading edge of the square signal and a negative pulse for the trailing edge. A bistable flip-flop is provided to permit the use of negative pulse generated by the leading pulse edge. The flip-flop comprises transistors Q11 and Q13 with associated resistors R14, R16, R20 and R22; intercoupling capacitors C12 and C13 with associated resistors R15 and R21 and diodes D13 and D14 to obtain stabilized collector volatges for transistors Q11 and Q13. The NPN type transistors Q11 and Q13 are cross-coupled in the usual way and the arrangement is such that the flip-flop has two stable states with one transistor conductive in each case. Switching between the two stable states takes place by applying a signal to any of the bases of the transistors.

In the exemplified embodiment, transistor Q11 is assumed to be conductive and consequently transistor Q13 is nonconductive and the collector of the same is at +11 volts. By differentiating the arriving square pulse from the trigger circuit the base in the transistor Q11 obtains, by action of the diode D11 which only permits passage of negative pulses, a negative voltage at the trailing edge of the square pulse which is so great that transistor Q11 switches to the nonconductive state, the transistor Q13, due to the cross-coupling, switching to the conductive state with a consequent drop in the collector voltage to approximately ground potential from the earlier voltage of +11 volts. It should be mentioned that a return to the starting state with transistor Q11 conductive and transistor Q13 non-conductive can be effected by a pulse passing in positive direction at the base in the transistor Q11, as will be explained hereinafter.

When transistor Q13 is non-conductive and consequently has a collector voltage of +11 volts, a current passes from the collector via a resistor R30 and a resistor R32 to —50 volts. Due to a diode D17 and a diode D18 in connection with, inter alia, resistors R32 and R34 the point to which diodes D15, D16 and D18 are all connected with their anodes lies at approximately ground potential. Both of the electrodes of capacitor C17 will have this ground potential as will also the control grid of a triode V1 which is connected as a cathode follower, and across a cathode resistor R29 because the current passing through the triode between the anode and the cathode causes such a voltage drop that the cathode of triode V1 is substantially at ground potential, or somewhat higher. It can be assumed that a current under these conditions passes through NPN transistor Q14 and resistor R25. The base of the transistor is in connection with the cathode in triode V1. The voltage at the collector of transistor Q14 which is determined by the voltage drop across resistor R14, having one end connected to +200 v. and the other end to the collector and resistor R23 and capacitor C15 to ground, is passed to the base of NPN transistor Q16, the collector of which, via a resistor R35, is in connection with +50 volts and, further, via a Zener diode D19—to obtain a suitable voltage level—is in connection with the right hand electrode of capacitor C17 at approximately ground potential. Current through transistor Q16 can, via resistor R35, transistor Q16, diode D19, resistors R36 and R37, pass to —50 volts. It should be noted that the other end of capacitor C17 is connected to the grid of triode V1 and via resistor R31 and capacitor C16 to ground.

When switching is effected by the trailing edge of the square pulse at the input point 5a to non-conductive state of transistor Q11 and conductive state of transistor Q13, the collector of transistor Q13 will have approximately ground potential and the junction voltage between resistors R30 and R32 drops. Diode D17 only allows a drop to a voltage insignificantly below ground potential, after which the current passing through diode D17 causes a locking of the junction voltage at a value which lies perhaps one half volt lower than previously. This lowering of the voltage is sufficient to cause diodes D15, D16 and D18 with their cathodes to lie at a voltage higher by said one half volt than that which the anodes now show, whereby current does not pass through the diodes.

The following functions now occur. Discharging current is supplied via resistor R35, transistor Q16 and Zener diode D19 to capacitor C17. The circuit permits this current to pass, via resistor R34, to —50 volts. As is evident, the voltage drop occurring across resistor R34 determines the bias on the control grid in triode V1. If it be desired that the charge of capacitor C17 is effected in such a way that the voltage across capacitor C17 rises linearly with time it can be easily understood that this corresponds to a constant voltage drop across resistor R34 (respectively across resistor R34 connected in parallel with resistor R38 on more rapid charging). If the charging current should tend to change, the bias at the control grid of triode V1 will also change, thereby also the voltage on the cathode, of triode V1 and thus at the base of transistor Q14 which is a NPN transistor. Due to the connector of the base of NPN transistor Q16 with the collector of transistor Q14, the change in conditions will be such that the tendency to change the charging current is counteracted and a substantially linear increase in the voltage of the right hand electrode of capacitor C17 takes place while the left hand electrode remains at a substantially constant voltage deviating but slightly from ground potential. A voltage change has thus been obtained on the right electrode of capacitor C17 of the desired type, that is, generation of a linearly rising sweep voltage.

The following function also takes place simultaneously with the rising voltage at the right hand electrode of capacitor C17, the slope of the voltage rise being substantially determined by resistor R34 which, for obtaining the more rapid rise required in conjunction with the enlargement of the image portion by means of switch 02, is connected in parallel with resistor R38, whereby the resulting resistance in the circuit becomes less. A certain portion of the voltage between the right hand electrode of capacitor C17 and —50 volt is taken out by means of a voltage divider comprising resistors R36 and R37, and is passed, via resistor R33, to the base of a NPN transistor Q15, the collector of which is connected to +50 volts. The emitter of the transistor is connected via a resistor potentiometer R27, provided with an adjustable tap, to −50 volts. When the voltage on the right hand electrode of capacitor C17 has reached a predetermined value, the voltage at the tap on the resistor R27 reaches such a magnitude that the base of transistor Q11 connected thereto via diode D12 obtains sufficient voltage to shift transistor Q11 to the conductive state and transistor Q13 thereby back to the non-conductive state, the collector of transistor Q13 returning to the voltage of +11 volts. The charging of capacitor C17 is thus terminated and the anodes of diodes D15, D16 and D18 return to the original approximately one-half volt higher value, with the initial states reset for the arrangement comprising triode V1 and transistors Q14 and Q16. The capacitor C17 is discharged through resistors R36 and R37 until the voltage of the right hand electrode of the capacitor drops to ground potential when a complete cycle is completed.

The circuit conditions are such that the discharge of capacitor C17 in a usual manner takes place more rapidly than the charge whereby a saw tooth form is obtained for the voltage taken out at point 16, via resistors R39 and R40, from capacitor C17. By changing the position of the switches 02 from the position shown in FIG. 4, in which only resistor R34 is included in the charging path, to the position in which resistor R38 is connected in parallel with resistor R34 a more rapid recharging is obtained, which is necessary for the intended image enlargement. At the same time as the position of the switch 02 is changed there is effected a positive change in the position of switch 01, a greater delay being obtained in the manner which has already been described in conjunction with FIG. 3.

For the sake of completeness, it should be mentioned that certain stabilizing arrangements which, inter alia, include PNP transistor Q12, have been included as they are part of an actually tried circuit system. Transistor Q12 is a common emitter amplifier with its emitter connected to +11 v. and its collector to ground. The base bias is established by resistors R17 and R18 connected between +50 v. and ground. Its collector is connected to the diodes D13 and D14 to provide the stabilization of the trigger circuit in connection with filter capacitor C14 and resistor R19. It should also be mentioned that a signal can be taken from the collector of transistor Q11, the signal being used to provide for extinction (blanking) of the electron beam in the cathode ray tubes used during the period, that is, when capacitor C17 obtains a discharge down to approximately ground potential (and until transistor Q11 is once more non-conductive).

In a working embodiment of the circuit system, the component parts according to FIG. 4 had the following values (in the arrangement for horizontal or lateral deflection).

| | |
|---|---|
| R13 | 39 kiloohms. |
| R14 | 3.3 kiloohms. |
| R15 | 12 kiloohms. |
| R16 | 270 kiloohms. |
| R17 | 2.7 kiloohms. |
| R18 | 680 ohms. |
| R19 | 22 kiloohms. |
| R20 | 270 kiloohms. |
| R21 | 12 kiloohms. |
| R22 | 3.3 kiloohms. |
| R23 | 150 ohms. |
| R24 | 39 kiloohms. |
| R25 | 150 ohms. |
| R27 | 10 kiloohms (potentiometer). |
| R29 | 12 kiloohms. |
| R30 | 1.2 kiloohms. |
| R31 | 180 ohms. |
| R32 | 15 kiloohms. |
| R33 | 3.3 kiloohms. |
| R35 | 100 kiloohms. |
| R34 | 100 kiloohms. |
| R36 | 82 ohms. |
| R37 | 4.7 kiloohms. |
| R38 | 100 kiloohms. |
| R39 | 15 kiloohms. |
| R40 | Selected according to desired output voltage and may possibly be excluded. |
| D11, D18 | 1N660. |
| D19 | B2Y85 for 5.5 volts. |
| Q11, Q13 | 2N914. |
| Q12 | 2N1132. |
| Q14 | 2N915. |
| Q15, Q16 | 2N1893. |
| V1 | Nuvistor tube 7895 (RCA). |
| C11 | 100 pf. |
| C12 | 22 pf. |
| C13 | 22 pf. |
| C14 | 0.47 μf. |
| C15 | 22 pf. |
| C16 | 22 pf. |
| C17 | 6.8 nf. |

A sweep amplifier will now be described. The sweep amplifier serves to provide deflection voltages, extending symmetrically with regard to the starting level, from the sawtooth voltage emanating from the sweep generator and being exclusively on one side of a starting level such as the ground potential. Each of the deflection voltages is to be passed to one plate of a pair of deflection plates of the cathode ray tube. In such a case, it is desirable for horizontal deflection, irrespective of the removed portion (in the horizontal direction), to produce a deflection which includes the complete horizontal extension of the image field. It is the instants of time for the initiation of the deflection and the sweep velocity which are changed in the manner already described.

For vertical deflection in the present case, it is desirable to include the complete vertical extension of the image, which initially was assumed to include only a part of the vertical extension of the image screen, to extend it to include the complete vertical extension of the image area. Thus it is clear that in this case no delay is necessary but that the sweep amplitude must be increased and the larger sweep amplitude must be permitted to begin in such a way that a symmetric image is obtained around the center point, with regard to the vertical direction. If a portion other than that assumed initially is to be removed for enlargement it is obvious that the conditions must be adapted thereto, which is readily possible to one skilled in the art having knowledge of the information disclosed herein.

Figure 5:
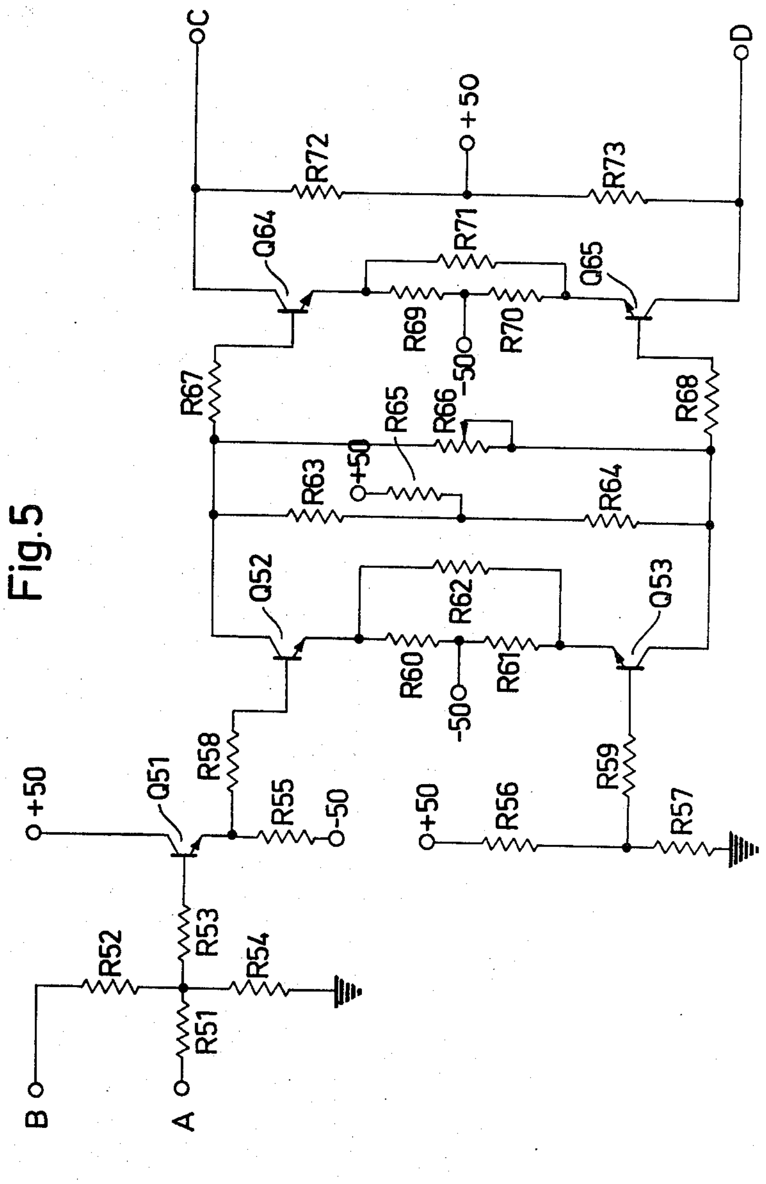
FIG. 5 is a detailed diagram of a sweep amplifier.

FIG. 5 shows a sweep amplifier suited for the purpose disclosed herein. A sweep signal is passed to an input A, in the form of sawtooth voltage, for instance obtained from the sweep generator shown in FIG. 4 and situated on one side of ground potential, for instance on the positive side of ground potential. This voltage is passed, via resistors R51 and R53, to the base of a NPN transistor Q51 which has its collector connected directly to +50 volts and its emitter to −50 volts, via a resistor R55. By connecting an input B in some suitable manner, a selected position setting can be obtained via resistors R52 and R54. The transistor Q51 provides an amplified signal across a resistor R55. This signal is passed to the base of an NPN transistor Q52, the collector of which, via resistors R63 and R65, is connected to +50 volts. The emitter of transistor Q52 is connected, via a resistor R60, to −50 volts and a sawtooth signal also appears across this resistor. The signals appearing across resistor R60 are passed, via a resistor R62, to the emitter of a NPN transistor Q53 which is provided with an emitter resistor R61 connected to −50 volts. When the signals via resistor R62 cause the emitter of transistor Q53 to vary with regard to its voltage and when the base of transistor Q53 simultaneously, by means of resistors R59, R56 and R57, obtains a suitable constant bias near ground potential, corresponding current changes in the collector circuit of transistor Q53 are obtained. The collector circuit is connected to +50 volts via a resistor R64 and a resistor R65, common to transistors Q52 and Q53.

The circuit now described obviously causes, due to the varying signal at the base of transistor Q51 and the constant voltage at the base of transistor Q53, a phase reversal and saw tooth signals appear across resistors R63 and R64 in phase opposition and are passed, via resistors R67 and R68, to the bases of NPN transistors Q64 and Q65, respectively. An adjustable resistor R66 serves to adjust the signals which are applied to the bases of transistors Q64 and Q65 respectively.

Transistors Q64 and Q65 with collector resistors R72 and R73 respectively and emitter resistors R69 and R70 amplify by negative feed from resistor R71, further signals which can be taken out in the form of symmetric signals at points C and D. Point C may be connected with one plate and point D with the other plate of a pair of plates for horizontal and vertical deflection respectively, provided in cathode ray tube KR.

In an actually designed scan or sweep amplifier the component parts thereof have the following values:

| | |
|---|---|
| R51 | 12 kiloohms. |
| R52 | 180 kiloohms. |
| R53 | 100 ohms. |
| R54 | 12 kiloohms. |
| R55 | Do. |
| R56 | 10 kiloohms. |
| R57 | 390 ohms. |
| R58 | 100 ohms. |
| R59 | Do. |
| R60 | 10 kiloohms. |
| R61 | Do. |
| R62 | 12 kiloohms. |
| R63 | 1.2 kiloohms. |
| R64 | Do. |
| R65 | Do. |
| R66 | 20 kiloohms (potentiometer). |
| R67 | 100 ohms. |
| R68 | Do. |
| R69 | 10 kiloohms. |
| R70 | Do. |
| R71 | 390 ohms. |
| R72 | 15 kiloohms. |
| R73 | Do. |
| Q51, Q52, Q53 | 2N915. |
| Q54, Q55 | 2N1893. |

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

We claim:

1. In a circuit system for enlarging in at least one direction of deflection a selected part of an image on the screen of a cathode ray tube by changing the starting instant of time and the sweep velocity of a sweep signal effecting deflection of the beam of the cathode ray tube and controllable by a synchronizing signal, the combination comprising:

a source of synchronizing signals;

a sweep generator means for generating sweep signals;

a trigger circuit means connecting said source of synchronizing signals to said sweep generator means, said trigger circuit means comprising a mono-stable means shifting from a stable state to a meta-stable state in response to the application of synchronizing signals and returning to the stable state after a predetermined period of time, said mono-stable means generating signals when returning to its stable state, time-constant circuit means controlling said period of time, said mono-stable means when returning to the stable state simultaneously changing the amplitude of signals applicable to the sweep generator means for starting the same and appearing when the mono-stable means shifts from its meta-stable state to its stable state; and a differentiating circuit means connected between the mono-stable means of said trigger circuit means and the sweep generator means, said differentiating circuit means generating, for starting the sweep generator means, a peaked pulse of short duration from a signal appearing when the mono-stable means returns to its stable state.

2. The circuit system according to claim 1, wherein said mono-stable means comprises transistors.

3. The circuit system according to claim 1 further comprising a bi-stable means operable to shift from one stable state to a second stable state in response to a peaked pulse of short duration, a capacitance means, charging means for charging said capacitance means with a linearly rising charging voltage, said charging means including self-compensating means for maintaining the charging current substantially constant, said bi-stable initiating charging of the capacitance means upon shifting from said one stable state to said second stable state and returning to said one stable state in response to a predetermined charging voltage across said capacitance means.

4. The circuit system according to claim 3 wherein said bi-stable comprises transistors.

5. The circuit system according to claim 3 wherein selectable resistance means are included in the charging circuit of the capacitance means, the selected resistance value of said selectable resistance means controlling the period of time after which the bi-stable returns to said one stable state.

6. The circuit system according to claim 3 further comprising a first amplifying means and a second amplifying means, the predetermined charging voltage across said capacitance means actuating said first amplifying means to operate said second amplifying means for feeding a signal of a polarity opposite to that of the peaked pulse of short duration to said bi-stable means to cause return thereof to said one stable state.

7. The circuit system according to claim 3 wherein said self-compensating means comprises signal amplifying means controllable by the charging current for said capacitance means, said signal amplifying means being connected as a power amplifier controlling a cascade of two amplifying means, the posterior one of said amplifying means activating the charging current for the capacitance means.

8. The circuit system according to claim 7 wherein said amplifying means comprises transistors.

9. The circuit system according to claim 8 wherein said transistors are NPN transistors.

10. The circuit system according to claim 1 further comprising sweep amplifier means for generating symmetric deflection voltages connected between said sweep generator and the cathode ray tube.

References Cited

UNITED STATES PATENTS 2,386,728 10/1945 Theisen.
3,011,164 11/1961 Gerhardt ---------- 315—24 X RODNEY D. BENNETT, Jr., Primary Examiner
T. H. TUBBESING, Assistant Examiner